United States Patent [19]

van der Lely

[11] 4,350,303

[45] Sep. 21, 1982

[54] DEVICE FOR SPREADING MATERIAL

[76] Inventor: Cornelis van der Lely, 7, Brüschenrain, Zug, Switzerland

[21] Appl. No.: 101,765

[22] Filed: Dec. 10, 1979

Related U.S. Application Data

[63] Continuation of Ser. No. 839,311, Oct. 4, 1977, Pat. No. 4,232,831.

[30] Foreign Application Priority Data

Oct. 4, 1976 [NL] Netherlands .......................... 7610949

[51] Int. Cl.³ ........................ A01C 17/00; A01C 19/00
[52] U.S. Cl. ..................................... 239/673; 222/407;
239/676; 239/682; 239/684
[58] Field of Search ............... 239/658, 667, 668, 670,
239/671–673, 676, 679, 680, 682, 687; 222/228,
242, 407, 627; 414/502, 519; 172/45, 96;
56/400; 366/326

[56] References Cited

U.S. PATENT DOCUMENTS

| | | | |
|---|---|---|---|
| 1,038,814 | 9/1912 | Alexander | 239/673 |
| 1,648,658 | 11/1927 | Nirider | 239/671 |
| 3,014,335 | 12/1961 | Nolt | 56/400 |
| 3,460,629 | 8/1969 | Shapland, Jr., et al. | 172/96 X |
| 3,479,807 | 11/1969 | Tiura | 56/400 |
| 3,845,885 | 11/1974 | Reed | 222/627 |
| 4,043,401 | 8/1977 | van der Lely | 172/96 X |

FOREIGN PATENT DOCUMENTS

| | | | |
|---|---|---|---|
| 1148795 | 5/1963 | Fed. Rep. of Germany | 239/673 |
| 1254748 | 6/1961 | France | 239/673 |

Primary Examiner—Andres Kashnikow

Attorney, Agent, or Firm—Penrose, Lucas, Albright, Mason, Mason & Albright

[57] ABSTRACT

Two spreading mechanisms disposed substantially completely across a rear outlet of a container-hopper having a movable deck, the spreader comprising a pair of two-part distribution members which rotate about vertical shafts which are disposed close to the edge of the deck. The upper part has four sets of resilient tines extending from angle irons spaced outwardly from the rotary shaft, the tines being bent at their ends and connected to the angle irons via coils whereby they are resiliently forced backward in their rotation through the fertilizer, usually manure, and when released resiliently spring forward whereby material engaged by the tines if flung outwardly. On the same shaft the lower part is a disc type ejector extending in substantial part under the moving deck to receive fertilizer which the tines miss. A freely rotatable guide member surrounds the shaft between the ejector and the tined portion to preclude material from winding around the shaft. A plate closure for the hopper outlet is raised vertically by two pairs of arms, one pair pivotally connected on each side of the hopper whereby the closure is lifted first vertically and then pivoted at its upper part somewhat forwardly whereby its lower edge which penetrates the fertilizer moves in a substantially vertical motion just ahead of the distribution members. The spreaders and the underlying deck are powered by a tractor power take-off. The closure is frictionally connected to piston and cylinder assembly on each side of the hopper and can be adjusted to various open or closed positions.

60 Claims, 7 Drawing Figures

DEVICE FOR SPREADING MATERIAL

RELATED PATENT

This is a continuation of application Ser. No. 839,311, filed Oct. 4, 1977 which issued as U.S. Pat. No. 4,232,831 Nov. 11, 1980.

The invention relates to a spreader, particularly, although not exclusively, for spreading manure.

According to a first aspect of the present invention there is provided a spreader comprising a hopper, for containing material to be spread and having a delivery outlet, and at least one rotary distribution member arranged adjacent the delivery outlet, the distribution member, or at least one of the distribution members, having working members which are resilient, or are resiliently movable or both. A distribution member having such resiliently movable working members in the form of tines is capable of evenly picking up material from the hopper and of spreading it uniformly over a large distance. In an advantageous embodiment of the spreader in accordance with this aspect of the invention, the end of at least one of the tines is inclined to the rest of that tine. This improves the picking up of the material by the tines, while the ejection of the material by the tines may, in addition, be enhanced.

An advantageous embodiment is obtained by fastening the tines to tine carriers arranged on a central part of the distribution member, these carriers extending substantially parallel to the rotary axis of the distribution member. The tines can thus be fastened easily and firmly. The resilience of the tines may be enhanced by connecting the tine portion located nearest the rotary axis of the distribution member to the distribution member by means of a helical spring portion.

According to a second aspect of the present invention, there is provided a spreader comprising a hopper, for containing the material to be spread and having a delivery outlet, and at least one rotary distribution member arranged adjacent the delivery outlet and at least for the most part at a higher level than the bottom of the hopper, there being further provided adjacent the delivery outlet at least one rotary ejection member disposed at a level lower than the bottom of the hopper in the region of the delivery outlet. Therefore, material dropping directly from the floor of the hopper will be captured by the ejection member and be distributed so that the uniform distribution of the material is further improved.

The distribution member and the ejection member may have arranged between them a guide member surrounding the rotary axis of the ejection member. Thus any long portions of the material for distribution are prevented from winding around the shaft of the ejection member or of the distribution member or both, so that the material will be effectively fed to and ejected by the ejection member.

According to a third aspect of the present invention there is provided a spreader comprising a hopper, for the material to be spread and having a delivery outlet and at least one distribution member adjacent the delivery outlet, there being further provided adjacent the delivery outlet a closing member which is connected for pivotal movement about two pivotal shafts with respect to the hopper. Uniform distribution of the material results immediately on initiation of the distribution of a quantity of material from the hopper using an embodiment in accordance with this aspect of the present invention. The closing member can thus move vertically upwards or downwards substantially across the area between the walls of the hopper when the hopper is opened or closed respectively. Thus the material can be directly engaged over its full height by the distribution member or members for removing the material from the hopper to give an even delivery.

BRIEF DESCRIPTION OF THE DRAWINGS

For a better understanding of the present invention and to show how it may be carried into effect, reference will now be made, by way of example only, to the accompanying drawings, in which.

DESCRIPTION OF THE PREFERRED EMBODIMENT

Although the spreader shown in the figures is primarily for spreading manure, it can also be used for spreading other materials.

The spreader comprises a frame 1 provided with a hopper 2. Four ground-engaging wheels are secured to the frame, with two wheels 3 and 4 disposed on each side. The axles of the wheels 3 are aligned with each other, as are the axles of the wheels 4. At the front the frame is provided with a drawbar 5 having a coupling eyelet 6. A pin 7 connects the coupling eyelet 6 with a mounting bar 8 of a tractor 9 or a similar vehicle.

The hopper 2 is constituted by a loading trough arranged on the frame 1. This trough comprises sidewalls 11 and 12, a front wall 13 and a bottom 14. A conveyor 15 passes over the bottom 14. Near the rear of the hopper are disposed two distribution members 16 and 17. The two distribution members are located between the end of the walls 11 and 12 and together cover substantially the whole width between these walls. It would be possible to provide only one distribution member or more than two distribution members. Just in front of the distribution members 16 and 17, between the walls 11 and 12, is arranged a closing member constituted by a closing slide 18 which is vertically movable to open and close the rear end of the hopper which constitutes a delivery outlet.

Figure 4:
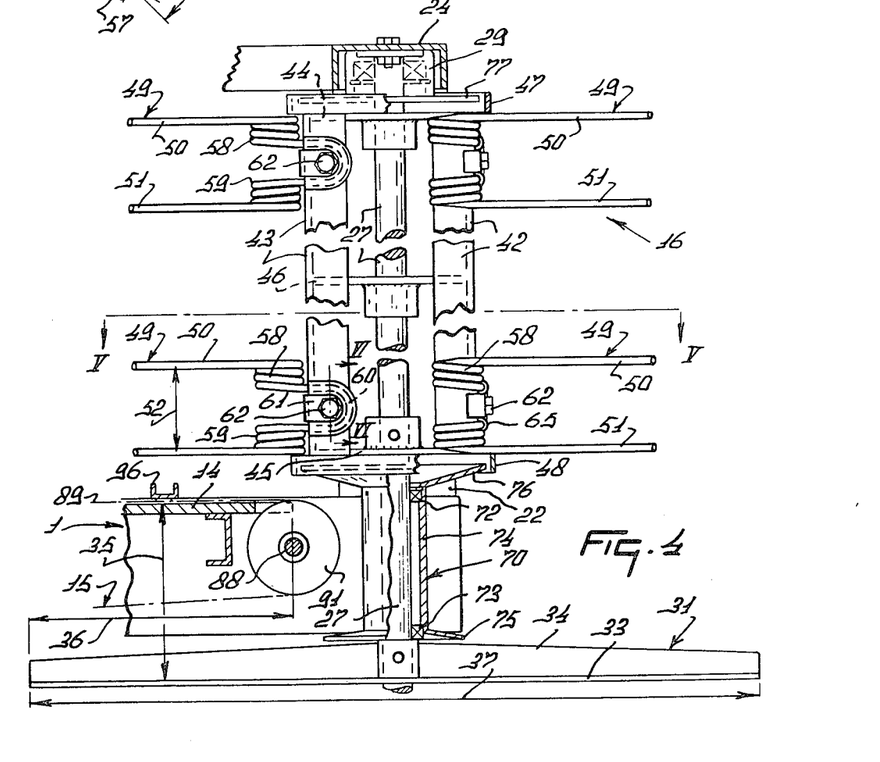
FIG. 4 is an enlarged elevational view of part of the spreader taken on the line IV—IV in FIG. 2.

To the rear of the frame 1 is attached a frame beam 21 extending transversely of the direction of length of the device, which coincides with the intended direction of travel in use. The rear ends of the walls 11 and 12 are each provided with vertical beams 22 and 23, the top ends of which are interconnected by a beam 24, which is located at substantially the same level as the top edges of the walls 11, 12 and 13. The frame beam 21 is provided with two bearing housings 25 and 26 accommodating transmission components. These bearing housings support vertical shafts 27 and 28 of the respective distribution members 16 and 17. The top ends of these shafts are journalled in bearings fastened to the beam 24, for example, the bearing 29 for the shaft 27 (FIG. 4). At a short distance above the bearing housings 25 and 26 the shafts 27 and 28 are provided with ejection members 31 and 32. Each of these ejection members comprises a round plate 33 arranged centrally on the shaft and having secured to it four ejection blades 34. These blades are made from strips disposed perpendicular to the plate 33. At their ends adjacent the shaft the ejection blades have a slightly greater height than they have at their ends adjacent the circumference of the plate 33. From FIG. 4 is will be appreciated that the ejection members 31 and 32, which are located at the same vertical level, are disposed at a level lower than the bottom of the hopper. The bottom 14, as will be seen from FIG. 4, Extends for a distance 36 over the top of each of the ejection members 31 and 32. The distance 36 is equal to about one third of the diameter of the ejection members. The top surface of the bottom 14 is at a distance 35 above the plate 33 of each of the ejection members, the distance 35 is approximately equal to one quarter of the diameter 37 of the ejection members.

Figure 5:
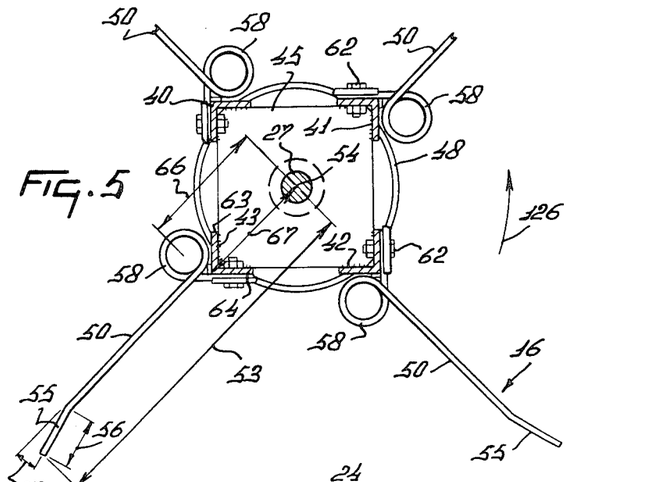
FIG. 5 is a plan sectional view of the part illustrated in FIG. 4 taken on line V in FIG. 4.
Figures 6, 7:
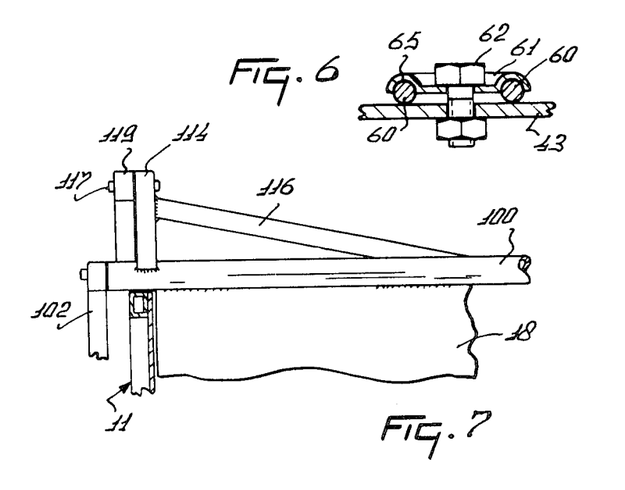
FIG. 6 is an enlarged sectional view taken on the line VI—VI in FIG. 4.
FIG. 7 is an enlarged view taken on the line VII—VII in FIG. 2.

The distribution members 16 and 17 are provided on the shafts 27 and 28 at a level higher than the top surface of the bottom 14. The distribution members have identical shapes and dimensions and so FIGS. 4 to 6 show only the distribution member 16. The distribution member has a central part comprising four tine carriers which are made from angle-section beams 40, 41, 42 and to 43 and extend parallel to the shaft 27. The beams 40 to 43 open towards the rotary axis of the shaft 27. The tine carriers 40 to 43 extend upwards from a position at a short distance above the bottom 14 to near the beam 24. The upper and lower ends of the carriers 40 to 43 are secured to the shaft 27 by plates 45 and 44. About halfway up the carriers 40 to 43, they are also secured to the shaft 27 by a square plate 46. At the top of the tine carriers 40 to 43 a ring 47 passes through the corners of the square plate 44. In the same manner the lower side of the distribution member 16 is provided with a ring 48. Each of the tine carriers 40 to 43 carries four pairs of working members constituted by tines which are equally spaced apart by the same amount on all the carriers. Near the bottom and top of each tine carrier is fastened a pair of tines with one of the tines of each pair located substantially in the same plane as the top and bottom ends respectively of the carriers 40 to 43 (see FIG. 4). The pairs of tines are all constructed and fastened to the beam concerned in the same way; therefore, this is illustrated in detail for only one pair of tines 49. Working members other than tines may be used.

Each pair of tines 49 comprises two tines 50 and 51 spaced apart by a distance 52. Each of the tines lies in a plane perpendicular to the shaft 28. The ends of the tines are located at a distance 53 from the center of the shaft 27; in this embodiment, the distance 53 is about forty-five cms. The tines extend substantially radially away from the shaft 27; see, for example, the tines 50 in FIG. 5. The end portion of each tine (see the end 55 of the tine 50) extends for a distance 56 at a small angle 57 of about 6° to the rest of the tine. The distance 56 is approximately one fifth of the length of the entire tine. Each of the tines 50 and 51 is coupled by three helical turns 58 and 59 respectively with a web portion 60, which interconnects the tines 50 and 51. Each pair of tines 49 is made from a single curved length of steel rod or wire, the turns 58 and 59 forming springs so that the tines 50 and 51 respectively are mounted resiliently. The web portion 60 of each pair of tines is immovably but releasably fastened to the respective tine carrier by means of a clamping plate 61 and a bolt 62. The clamping plate 61 has a groove 65 receiving the web portion 60 (FIG. 6). The web portion 60 is located midway between the tines 50 and 51, the helical spring portions 58 and 59 extending inwardly towards each other from the tines 50 and 51 (FIG. 4). The helical spring portions 58 and 59 extend along one limb 63 of the L-shaped carrier, and the web portion 60 of the pair of tines concerned is connected to the other limb 64 of that carrier. The longitudinal axis of the portions 58 and 59 are parallel to the shaft 27.

Between the distribution members 16 and 17 and the ejection members 31 and 32 below them are arranged guide members 70 and 71 for free rotation about the shaft 27 or 28 respectively. These guide members 70 and 71 are identical, and so only the member 70 is shown in detail in FIG. 4. The member 70 is freely rotatable about the shaft 27 on bearings 72 and 73. The guide member 70 has a cylindrical portion 74, which surrounds the shaft 27 with a small clearance; the bearings 72 and 73 are provided at the ends of this cylindrical portion. The lower end of the cylindrical portion 74 is provided with a ring 75. The upper end of the cylindrical portion 74 is provided with a conical portion 76, which flares upwardly, with its outer circumference located inside the ring 48. The outer circumference of the portion 76 fits within the inner circumference of the ring 48 with a small clearance. Near the top of each of the distribution members 16 and 17 is arranged a plate 77, see FIG. 4. This plate is positioned within the ring 47 and its outer circumference fits with a small clearance inside the inner circumference of the ring 47.

The transmission components in the bearing housings 26 are coupled with a driving shaft 80. The shaft 80 extends away from the bearing housing 26 towards the front in the longitudinal direction of the spreader and is coupled at the front of the spreader with transmission components in a driving casing 81. The casing 81 supports a shaft 82, with which an auxiliary shaft 83 is releasably coupled. The shaft 83 is connected with a power take-off shaft of the tractor 9. The transmission components in the bearing housings 25 and 26 are linked to one another by a shaft 84. The bearing housings 25 and 26 and hence the shafts 27 and 28 are disposed across the width of the hopper 2 at a position in which the distribution members 16 and 17 are exactly located between the rear ends of the vertical walls 11 and 12. The distribution members 16 and 17 have equal diameters, 85 each of which amounts to approximately half the distance between the inner sides of the walls 11 and 12.

The transmission components in the casing 26 connected with the shaft 80 are connected with a shaft 86, which is coupled with the transmission gear in a transmission casing 87. The transmission components in the casing 87 are coupled with a shaft 88 for driving the conveyor 15. The conveyor 15 comprises chains 89 and 90 looped over sprockets 91 and 92 connected with the shaft 88. The shaft 88 extends across the rear of the bottom of the hopper 2. Near the front of the hopper 2 is provided a shaft 93 carrying sprockets 94 and 95 around which are looped the chains 89 and 90. The conveyor 15 also comprises crossbars 96 extending between the chains 89 and 90 and formed by channel-sections beams, the limbs of which extend upwardly on the top run of the conveyor 15 passing over the bottom 14. The conveyor 15 constitutes an endless conveyor, the upper run of which is located over the top surface of the bottom 14.

Figure 1:
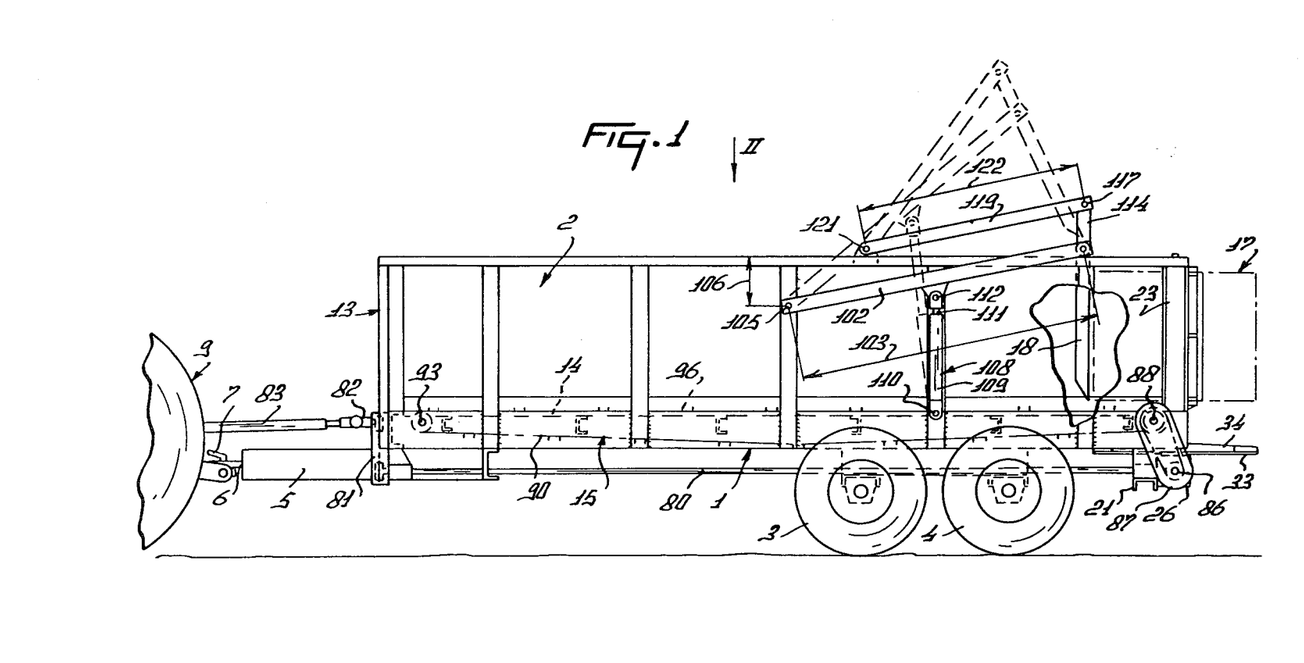
FIG. 1 is a side elevation of a manure spreader.
Figure 2:
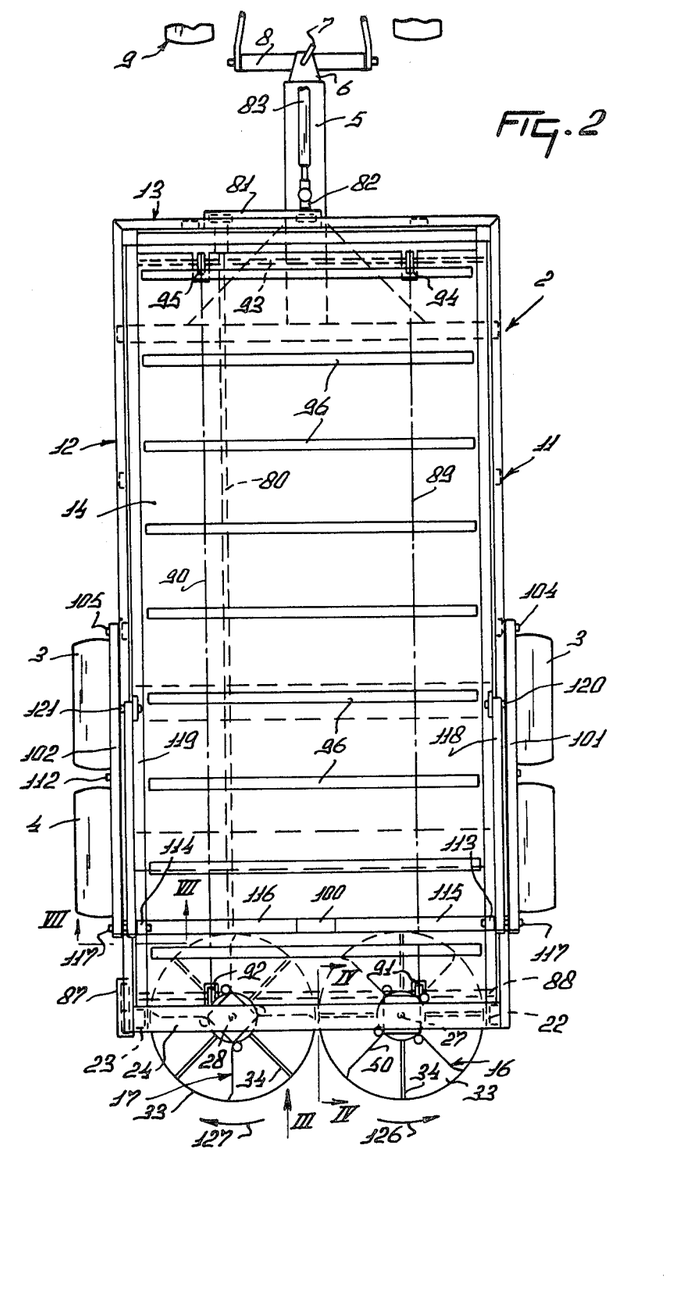
FIG. 2 is a plan view of the spreader of FIG. 1 taken in the direction of the arrow II in FIG. 1.
Figure 3:
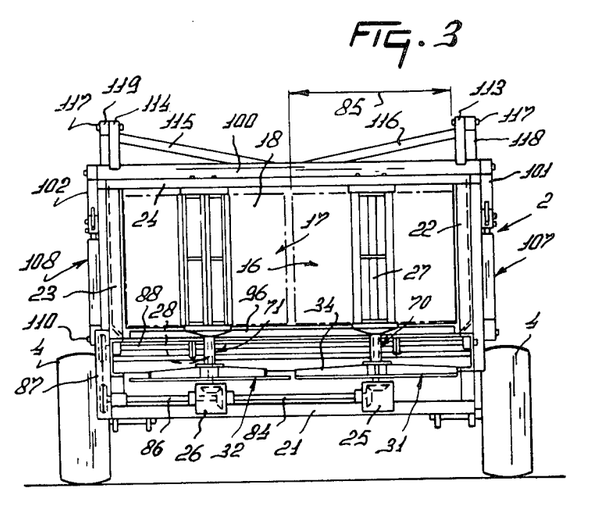
FIG. 3 is a rear view of the spreader of FIGS. 1 and 2 taken in the direction of the arrow III in FIG. 2.

The closing slide 18 covers the whole width of the hopper 2 between the walls 11 and 12. The slide 18 is perpendicular to the walls 11 and 12. The height of the slide 18 is substantially equal to the height of the hopper. A supporting beam 100 is provided at the top of the slide 18, and ends of this beam are pivotally connected with supporting arms 101 and 102. The supporting arms 101 and 102 have a length 103 and are mounted by aligned shafts 104 and 105 on the walls 11 and 12. The supporting arms 101 and 102 are located on the outer side of the walls 11 and 12 respectively. In the position shown in FIGS. 1 and 7, in which the lower end of thw slide 18 is located above the top surface of the bottom 14 by a distance equal to the height of the crossbars 96, the slide is supported by the supporting beam 100 which bears on the tops of the walls 11 and 12. The pivotal shafts 104 and 105 are located at a distance 106 below the tops of the walls 11 and 12. Midway along their length 103 the arms 101 and 102 are connected with supporting members 107 and 108 respectively. Each of these supporting members constitutes a braking mechanism and, as is indicated for the supporting member 108, comprises a cylinder 109, which is pivotable about a shaft 110 which is coupled with the wall 12 of the hopper 2 at a level of the bottom 14. A rod 111 is slidable with some friction in the cylinder 109 and is pivotally coupled with the arm 102 by a shaft 112. Near its ends the supporting beam 100 is provided with upwardly extending arms 113 and 114, which are furthermore coupled with the beam 100 by means of struts 115 and 116. Control arms 118 and 119 are fastened to the top ends of the arms 113 and 114 by pivotal shafts 117. These control arms are located on each side of the hopper 2 and are pivotally connected to the top sides of the walls 11 and 12 by aligned pivotal shafts 120 and 121. The arms 118 and 119 have a length 122, which is equal to about two thirds of the length 103 of the arms 101 and 102. In operation, the spreader is coupled by the drawbar 5 with a tractor or similar vehicle as is shown in FIGS. 1 and 2.

The hopper 2 is loaded with the material to be spread, for example manure, after which the device can be driven to a field where the manure is to be distributed. The slide 18 is held in the position indicated by solid lines in FIG. 1, the hopper 2 being then closed on all four sides by the walls 11, 12 and 13 and the slide 18. To spread the manure the slide 18 is moved into the position indicated by broken lines in FIG. 1.

The slide may be lifted manually so that it moves upwardly and tilts in accordance with the turn of the control arms 118 and 119 about the pivotal shafts 120 and 121 and of the supporting arms 101 and 102 about the shafts 104 and 105. The supports 107 and 108 are constructed so that the friction of the rods 111, or pistons connected thereto, in the cylinders 109 is so great that the slide 18 remains in any set position. If desired, the supports 107 and 108 may be hydraulically actuated using the hydraulic system of the tractor.

The distribution members 16 and 17 as well as the ejection members 31 and 32 and the conveyor 15 are coupled with the power take-off shaft of the tractor through the auxiliary shaft 83 and the various transmissions. During a run across a field, the conveyor 15 is moved so that the material is fed rearwardly through the hopper to the distribution members 16 and 17. The distribution members 16 and 17 are rotated by their respective drives in the casings 25 and 26 in opposite directions as indicated by arrows 126 and 127. The material fed beneath the slide 18 towards the distribution members 16 and 17 is engaged by the resilient tines of the distribution members and spread by the rotation of the distribution members across a width appreciably exceeding the width of the spreader. From FIG. 2 is it particularly apparent that the distribution members 16 and 17 are disposed so that the ends of the group of tines on a tine carrier of one distribution member are moving centrally between the groups of tines of the other distribution member within the working range thereof. In other words, the distribution members 16 and 17 are angularly offset from each other by half the angular spacing between adjacent tine carriers. During rotation of the distribution members the tines are resiliently stressed when engaging the manure in the hopper (about 150° of their arcs over bottom 14 as seen in FIG. 2) fed by the conveyor to the distribution members. By the resilient tension the resilient tines perform a scraping action on the supplied manure so that the tines catch and carry along small batches of manure, which are subsequently spread. In this way a satisfactory, even distribution of the manure may be obtained. Since the tines will bend slightly backwards with respect to the direction of rotation of the distribution member when they come into contact with the manure in the hopper, the path traced by the ends of the tines when they are in the hopper will be slightly flattened so that the manure can be satisfactorily captured, which enhances an even delivery. The width of spreading of the manure is thus increased, since at the release of the tines from the manure in the hopper the tension of the tines generated during the capture of the manure is released and the tines are accelerated in the direction of rotation of the distribution member concerned to flick the manure outwardly. The manure can thus be ejected farther. To improve the effect of the resilient tines it is important for the spring portions 58 and 59 to be at a distance from the shaft 27. The distance 66 between the center line of the shaft 27 and the center line of the portions 58 and 59 is about one third of the distance 53. It is furthermore important for the tine carriers to be at a distance 67 approximately equal to one third of the distance 53 from the shaft 27. In order to enhance the effect of the tines in distributing and capturing the manure in the hopper the ends of the tines are slightly bent forwards, with respect to the direction of rotation of the distribution members. With respect to the direction of rotation of the distribution members, the helical spring portions, for example, the portions 58 and 59 of the tines (FIG. 5) are located behind the tines. The helical turns of the portions 58 and 59 are such that the tines are under stress when engaging the manure in the hopper.

Manure delivered by the conveyor 15 to the rear along the bottom and not captured completely by the lower tines of the distribution members will drop down when they reach the end of the bottom. This manure will fall onto one of the ejection members 31 or 32 and will be distributed by these ejection members. Thus the uniform distribution obtained by the distribution members 16 and 17 is further improved by the ejection members 31 and 32. Consequently the manure delivered along the bottom side of the distribution members cannot drop onto the ground in the center of the strip of land to be covered.

The guide members 70 and 71 around the shafts 27 and 28 do not rotate with the shafts. Manure dropping down off the edge of the bottom 14 will move along the guide members so that it will not come into contact with the rotating shafts 27 and 28. Thus the manure is prevented from coming into contact with rotating parts such as the shafts 27 and 28, about which it might be wound. In the case of long tailings found in manure this would be a disadvantage, but due to the presence of the guide members 70 and 71, the manure can drop freely down onto the ejection members 31 and 32.

If the delivery of material to the distribution members has to be stopped, for example when turning at the ends of a field, the delivery of the slide 18 can be pressed down. Since the slide 18 moves about two pivotal shafts in the pivots 104 and 105 and the pivots 120 and 121 spaced apart from one another in the manner shown, the slide will maintain a substantially vertical orientation, particularly along the first part of its movement out of the position shown in FIG. 1, and afterwards, when it has risen above the walls 11 and 12, it will move into the inclined position shown in FIG. 1 by broken lines. Consequently, in the closed position, the slide 18 can be near the cylindrical plane traced by the ends of the tines of the distribution members 16 and 17. It is thus ensured that, when the slide 18 is opened, manure is fed almost immediately to the distribution members 16 and 17 over their whole height so that an advantageous delivery of manure is obtained.

Although in the embodiment described the feed of manure by the conveyor 15 is related to the speed of driven of the distribution members 16 and 17, the conveyor 15 may, as an alternative, be coupled with the ground-engaging wheels so that the supply of manure varies with the speed of travel of the spreader.

Although various features of the spreader described and illustrated are set forth in the following claims as inventive features, it is to be understood that the invention is not necessarily limited to these features and encompasses all novel inventive features which have been closed both individually and in various combinations.

Having thus described my invention, what I claim as new and desire to secure by Letters Patent of the United States is:

1. A spreader comprising a hopper for containing material to be spread, said hopper having a floor and a delivery outlet at one end of said floor, and two rotary distribution members arranged adjacent said delivery outlet and adapted to rotate about a substantially vertical axes at least in part in said outlet and over said floor, each said distribution member comprising a carrier and resilient working members mounted thereon, said carrier extending in at least generally the same direction as the axis of rotation of said distribution member and being spaced from said axis, each said working member including said working members nearest said floor mounted to extend for its entire length over said floor during part of its rotation, the paths of rotation of said two distribution members extending together approximately the enitre width across said delivery outlet and individually substantially meeting midway across said delivery outlet.

2. A spreader as claimed in claim 1, wherein each said axis is perpendicular to said floor.

3. A spreader as claimed in claim 2, wherein each of said working members extends substantially radially with respect to said rotary axis of said distribution member.

4. A spreader as claimed in claim 3, wherein said working members are substantially contained in a vertical plane which also contains said rotary axis of said distribution member.

5. A spreader as claimed in claim 2, wherein the height of the distribution member is substantially equal to the height of said hopper.

6. A spreader as claimed in claim 5, wherein there are a pair only of said distribution members which rotate in opposite directions and are arranged adjacent said delivery outlet of said hopper.

7. A spreader as claimed in claim 6, wherein said distribution members do not overlap and each said distribution member has a diameter substantially equal to one-half the width of said hopper whereby the distance between said distribution members is very small and said distribution members operate so that they are turning to the rear where they are adjacent.

8. A spreader as claimed in claim 7, comprising walls for said hopper, frame parts and shaft means wherein each said distribution member is mounted on said shaft means which is received by bearings provided at the bottom and top ends of said frame parts, said bearing at said top end being located at least substantially at the level of the upper edges of said hopper walls.

9. A spreader as claimed in claim 8, wherein an ejection member connected to said shaft means is disposed beneath each said distribution member at a level lower than said delivery outlet.

10. A spreader as claimed in claim 1, wherein the end portion of each said working member is inclined with respect to the rest of that working member.

11. A spreader as claimed in claim 10, wherein said inclined end portion of each said working member has a length approximately equal to one-fifth of the length of the entire working member.

12. A spreader as claimed in claim 10, wherein said inclined end portion of each said working member is inclined forwardly of the rest of each said working member with respect to the intended direction of operative rotation of said distribution member.

13. A spreader as claimed in claim 2, wherein each said working member is fastened to said carrier at a location spaced from said rotary axis of said distribution member by a distance approximately equal to one-third of the length of each said working member.

14. A spreader as claimed in claim 13, wherein a plurality of said carriers are provided, each of which extends substantially parallel to said rotary axis of said distribution member.

15. A spreader comprising a hopper for containing material to be spread, said hopper having a bottom and a delivery outlet defined at one edge of said bottom, and two rotary distribution members both of which are arranged adjacent said delivery outlet and are adapted to rotate about substantially vertical axes which are perpendicular to said bottom at least in part therein and at least substantially at a higher level than the bottom of said hopper, said distribution members including tines which extend substantially radially from their corresponding said axes of rotation and during about 150° of said rotation in said delivery outlet are immediately and spaced a short distance directly above said bottom, there being further provided adjacent said delivery outlet a plurality of rotary ejection members disposed at a level lower than the bottom of said hopper at a location adapted to receive material from said hopper by gravity from said delivery outlet, said distribution members together extending substantially for the entire width of said delivery outlet, and their paths of rotation closely meeting half way across the width of said delivery outlet.

16. A spreader as claimed in claim 15, wherein each said distribution member has a width above said bottom greater than its height.

17. A spreader as claimed in claim 15, wherein there are two ejection members, each said ejection member being rotatable about an upwardly extending axis.

18. A spreader as claimed in claim 17, wherein the rotary axis of each said ejection member coincides with the rotary axis of each corresponding said distribution member.

19. A spreader as claimed in claim 18, wherein each said ejection member has a circumference which has said rotary axis as its center.

20. A spreader as claimed in claim 19, wherein each said ejection member comprises an ejection disc provided with ejection blades mounted thereon.

21. A spreader as claimed in claim 20, wherein said ejection blades are formed by strips disposed along radii of said ejection disc.

22. A spreader as claimed in claim 20, wherein each said ejection member has a diameter substantially the same as of each said distribution member.

23. A spreader as claimed in claim 22, wherein at least part of each said ejection member is spaced vertically beneath the bottom of said hopper.

24. A spreader as claimed in claim 23, wherein each said ejection member is overlapped by the bottom of said hopper by a distance which is substantially equal to one-third of the diameter of such ejection member.

25. A spreader as claimed in claim 24, wherein each said ejection member is located below the upper surface of said hopper's bottom by a distance which is approximately equal to one quarter of the diameter of such ejection member.

26. A spreader as claimed in claim 25, wherein the lowermost of said tines is located at a short distance above the level of the bottom of said hopper and substantially entirely over said bottom when extending forwardly.

27. A spreader as claimed in claim 18, wherein said distribution member and said ejection member are fastened to a common shaft.

28. A spreader as claimed in claim 17, in which a guide member extends around the rotary axis of said ejection member and is arranged to extend longitudinally for the distance between each said distribution member and a corresponding said ejection member.

29. A spreader as claimed in claim 28, wherein said guide member extends from a location above the bottom of said hopper to a location lower than the bottom of said hopper.

30. A spreader as claimed in claim 28, wherein said guide member extends from the upper side of said ejection member to a location adjacent to and a short distance above the bottom of said hopper.

31. A spreader as claimed in claim 28, wherein said guide member is coaxial with said rotary axis of said ejection member and comprises a cylindrical portion.

32. A spreader as claimed in claim 31, wherein said guide member is provided with a conical upper portion which flares upwardly.

33. A spreader as claimed in claim 32, wherein the lower part of said conical portion is located substantially level with the upper side of said hopper's bottom.

34. A spreader as claimed in claim 17, wherein each said hopper is provided adjacent each said distribution member with a movable closing member for opening and closing said delivery outlet of said hopper to a selected extent, said closing member being located closely proximate for the entire height of cylindrical planes which are traced by rotation of said working members of each said distribution member.

35. A spreader as claimed in claim 34, wherein said closing member comprises a slide, which, in the closed position, is parallel to the rotary axis of each said distribution member.

36. A spreader as claimed in claim 35, wherein said closing member is connected with said hopper so as to be pivoted about two relatively spaced pivotal shafts mounted on said hopper.

37. A spreader comprising a hopper for the material to be spread and having a delivery outlet, at least one distribution member adjacent said delivery outlet, said distribution member having an upwardly extending axis which is perpendicular to the bottom floor of said hopper, said distribution member having a plurality of vertically spaced tines adapted to rotate about said axis with their outer ends spaced an equal distance from said axis and travelling in a cylindrical plane, there being further provided adjacent said delivery outlet a closing member and means mounting said closing member on two non-aligned pivotal shafts for pivotal movement of said closing member about said two horizontal pivotal shafts with respect to said hopper so constructed and arranged that when said closing member is in closed position it is parallel to said axis and virtually tangential to said cylindrical plane.

38. A spreader as claimed in claim 37, wherein said closing member is connected, at two vertically spaced locations at its top side, to supporting two arms, which are mounted on a wall of said hopper so as to be pivotable about said spaced pivotal shafts.

39. A spreader as claimed in claim 38, wherein on each side of said hopper, said two arms are connected with said closing member, these arms being substantially parallel to one another in the closed position of said closing member.

40. A spreader as claimed in claim 39, wherein one of said supporting arms on each side of said hopper is connected to said hopper by means of a support which comprises a braking mechanism for holding said closing member in a set position.

41. A spreader as claimed in claim 40, wherein said braking mechanism comprises piston and cylinder means, said piston means being relatively movable in said cylinder means with friction.

42. A spreader as claimed in claim 39, wherein one of said arms is longer than the other.

43. A spreader as claimed in claim 42, wherein one of said arms is fastened to a wall of said hopper beneath the top side thereof, and the other said arm constitutes a control arm and is fastened to said hopper wall adjacent the top of side thereof.

44. A spreader as claimed in claim 43, wherein said control arm is pivoted to said closing member at a higher point than the other said arm.

45. A spreader as claimed in claim 44, wherein said supporting arms are located on the side of said closing member facing into said hopper.

46. A spreader comprising a hopper for containing material to be spread and having a delivery outlet, two rotary distribution members arranged adjacent said delivery outlet and substantially at a higher level than the bottom of said hopper, the axes of rotation of said distribution members being substantially vertical and parallel to each other, each said distribution member mounting a carrier with tines extending therefrom radially relative the carrier's axis of rotation which are adapted to rotate at least in substantial part over the bottom of said hopper, each said tine extending for its entire length over said bottom during a portion of its rotation, the overall width of each said distribution member being about one-half of the overall width of said delivery outlet, each said distribution member including a shaft with a rotary ejection member disposed on said shaft at a level lower than the bottom of said hopper so as to receive material from said delivery outlet and said distribution members by gravity, support means across the top of said hopper supporting said distribution members at least in substantial part, a vehicle connected to said spreader for moving same, said two distribution members being connected to each other by means whereby one said distribution member is connected to drive the other said distribution member, said one distribution member being connected with a driving shaft which is supported by said hopper and which is adapted to be connected with a further driving shaft of said vehicle.

47. A spreader as claimed in claim 46, wherein a said distribution member and said ejection member are mounted on a common upwardly extending shaft, the lower end of said shaft being connected with a transmission provided in a bearing housing which is secured to a frame beam of the spreader, said bearing housing partly supporting said shaft.

48. A spreader as claimed in claim 46, wherein said first mentioned driving shaft is connected with means to drive a conveyor disposed in the lower region of said hopper.

49. A spreader as claimed in claim 48, wherein, as seen from the side, side walls of said hopper extend to the position of the center of said distribution member.

50. A spreader as claimed in claim 49, wherein the rear ends of said side walls of said hopper are interconnected at the top by said support means comprising a frame beam which supports the top ends of a respective shaft of each said distribution member.

51. A spreader comprising a hopper adapted to contain material to be spread and having a delivery outlet at the rear thereof, a pair of rotary distribution members arranged adjacent said delivery outlet and adapted to rotate about a substantially vertical axis, each said rotary distribution member comprising outwardly extending tines all of which are adapted to rotate in a substantial part of their rotation over the bottom of said hopper, a rotary shaft of each said distribution member extending downwardly therefrom back of the bottom of said hopper and having mounted thereon a substantially horizontal rotary ejection member disposed at a level lower than the bottom of said hopper whereby it rotates in part of its rotation under the bottom of said hopper, said rotary ejection member of each said distribution member adapted to receive material from said delivery outlet of said hopper and by gravity from the remainder of said distribution member, guide means provided around each said shaft longitudinally for the entire distance between the tined portion of said distribution members and the rotary ejection member mounted thereon whereby each said shaft is prevented by said guide means from contact with the material being spread from said hopper, said guide means being freely rotatable relative to said shaft.

52. A spreader as claimed in claim 51, wherein said tines are resilient and include a portion bent forwardly at the end of each said tine whereby when each said tine is rotated through material to be spread it is resiliently deflected and, upon breaking free of said material flings portions of said material outwardly by a resilient flinging motion.

53. A spreader comprising a hopper for containing material to be spread, said hopper having a floor and a delivery outlet at one end of said floor, and two rotary distribution members arranged adjacent said delivery outlet and adapted to rotate about substantially vertical axes perpendicular to said floor at least in part in said outlet and over said floor, each said distribution member comprising a carrier and resilient working members mounted thereon, said carrier extending at least generally in the same direction as the axis of rotation of said distribution member and being spaced from said axis, each said working member including said working members nearest said floor mounted to extend for the greater part of its length over said floor during part of its rotation, the paths of rotation of said two distribution members extending together substantially across said delivery outlet and individually substantially meeting midway across said delivery outlet, each said working member being fastened to said carrier at a location spaced from said rotary axis of said distribution member by a distance approximately equal to one-third of the length of each said working member, a plurality of said carriers being provided, each of which extends substantially parallel to said rotary axis of said distribution member, each said carrier comprising an angle-section member which opens toward said rotary axis of said distribution member and wherein each limb of each said angle-section member is disposed at about a 45° angle to a plane intercepting said angle-section member and said rotary axis, the portion of each said working member located nearest said rotary axis of said distribution member being connected with said carrier by means of a helically wound spring portion mounted on said carrier member, each said working member being releaseably mounted on a limb of said angle-section member, said helically wound spring portion of each said working member being located adjacent to and spaced from the other limb of said carrier relative to that to which such working member is mounted.

54. A spreader comprising a hopper for containing material to be spread, said hopper having a floor and a delivery outlet at one end of said floor, and two rotary distribution members arranged adjacent said delivery outlet and adapted to rotate about vertical axes perpendicular to said floor, each said distribution member comprising a carrier and resilient working members mounted thereon, said carrier extending in at least generally the same direction as the axis of rotation of said distribution member and being spaced from said axis, each said working member being fastened to said carrier at a location spaced from said rotary axis of said distribution member by a distance approximately equal to one-third of the length of each said working member, a plurality of said carriers being provided, each of which extends substantially parallel to said rotary axis of said distribution member, each said carrier comprising an angle-section member which opens toward said rotary axis of said distribution member and wherein each limb of each said angle-section member is disposed at about a 45° angle to a plane intercepting said angle-section member and said rotary axis, each said working member including said working members nearest said floor mounted to extend substantially its entire length over said floor during part of its rotation, the paths of rotation of said two distribution members extending together substantially across said delivery outlet and individually substantially meeting midway across said delivery outlet.

55. A spreader as claimed in claim 54, wherein the portion of each said working member located nearest said rotary axis of said distribution member is connected with said carrier by means of a helically wound spring portion mounted on said carrier member.

56. A spreader as claimed in claim 55, wherein each said working member is releasably mounted on a limb of a said angle-section member.

57. A spreader as claimed in claim 54, wherein said helically wound spring portion of each said pair of working members is located behind the respective said pair of working members with respect to the intended direction of operative rotation of said distribution member.

58. A spreader as claimed in claim 57, wherein said pairs of working members are disposed at eight locations along said rotary axis of said distribution member.

59. A spreader as claimed in claim 54 wherein said distribution member comprises four said carriers, each said carrier comprising an angle-section beam with the apex of its angle being the farthest portion of said angle-section beam from said axis and being provided with at least one said working member connected to a limb of said beam and extending outwardly relative to said apex.

60. A spreader as claimed in claim 59, wherein said carriers are angularly equispaced around said rotary axis of said distribution member whereby the limbs of said carriers as seen in cross-section coincide with a square at the corners thereof.

* * * * *